United States Patent
Patt et al.

(10) Patent No.: US 7,372,570 B2
(45) Date of Patent: May 13, 2008

(54) INCIDENT LIGHT REDISTRIBUTION TO COMPENSATE FOR RADIAL GRADIENT IN DETECTOR

(75) Inventors: Paul J. Patt, Blackhawk, CA (US); German Arciniegas, Oakland, CA (US); Jeffry Ceremony, Fairfield, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 104 days.

(21) Appl. No.: 11/429,213

(22) Filed: May 5, 2006

(65) Prior Publication Data

US 2006/0285204 A1    Dec. 21, 2006

Related U.S. Application Data (60) Provisional application No. 60/681,204, filed on May 13, 2005.

(51) Int. Cl.
*G02B 5/08* (2006.01)
*G01N 21/64* (2006.01)

(52) U.S. Cl. ............... 356/417; 250/458.1; 359/850; 359/851; 362/346; 422/82.08; 436/172

(58) Field of Classification Search ............ 356/317, 356/417; 250/458.1, 461.1; 422/82.08; 435/288.7; 436/172; 359/850, 851, 866; 382/346

See application file for complete search history.

(56) References Cited

U.S. PATENT DOCUMENTS

| | | | |
|---|---|---|---|
| 5,134,553 A | * | 7/1992 | Hasegawa ............... 362/223 |
| 6,542,304 B2 | | 4/2003 | Tacklind et al. |
| 6,840,640 B2 | | 1/2005 | Antoni et al. |

* cited by examiner

*Primary Examiner*—F. L. Evans
(74) *Attorney, Agent, or Firm*—Townsend and Townsend and Crew LLP.; Henry Heines (57) ABSTRACT

Nonuniformities in the efficiency of detection of individual fluorescing reaction mixtures in a well plate with a two-dimensional array well array are corrected. The nonuniformities arise both from the stimulation pattern and the detection pattern, and are corrected by adding additional segments to a pair of segmented mirrors. The additional segments are oriented to direct light to the outermost reaches (i.e., the four corners) of the array and thereby produce a stimulation pattern that has a greater intensity in the outermost regions. This compensates for a radial decline in the efficiency of the detector in detecting the emissions from the well plate, the radial decline being an artifact of systems that utilize CCDs or similar components as detectors.

16 Claims, 6 Drawing Sheets

INCIDENT LIGHT REDISTRIBUTION TO COMPENSATE FOR RADIAL GRADIENT IN DETECTOR

CROSS-REFERENCE TO RELATED APPLICATION

This application claims benefit from U.S. Provisional Patent Application No. 60/681,204, filed May 13, 2005, the contents of which are incorporated herein by reference in their entirety.

BACKGROUND OF THE INVENTION

1. Field of the Invention

This invention relates to the generation and detection of electromagnetic emissions in a multitude of samples retained in individual wells of multi-well plates or two-dimensional sample arrays in general. This invention is of particular interest in the performance of the polymerase chain reaction (PCR) with real-time detection, i.e., PCR processes in which the amounts of nucleic acid in individual reaction wells are quantitated as the PCR reaction is progressing. The invention has general applicability however to any system that simultaneously detects emission signals from a multitude of wells, receptacles, or sample spots in a two-dimensional rectangular array.

2. Description of the Prior Art

Real-time PCR is one of many examples of chemical processes that employ area imaging to monitor the progress of a multitude of reactions that are being performed simultaneously. Area imaging is the formation of an image of the emissions from a two-dimensional array of reaction wells such as the arrays used in PCR systems. The emissions are fluorescence emissions generated by fluorescent molecular groups covalently attached to the nucleic acid segments in the wells. The imaging method involves the illumination of the entire array of reaction wells to stimulate the fluorescent groups, and the detection of the radiations that the fluorescent groups emit as a result of the stimulation. The emissions are detected in the form of a two-dimensional image corresponding to the well array. The most common array is one that contains 96 wells in a single plate, the wells arranged in 12 rows of 8 wells each, but other arrays and numbers of wells are used as well. From the magnitudes of the emissions, the system determines the amount of binding, the tag concentration, and the characteristics of the fluorescent molecule in each well. This information is processed to indicate the progress of the reaction in each well. The illumination band can be narrow such as that obtained with a laser, or broad such as that obtained with a whitelight source.

Whitelight sources are an inexpensive means of providing a wide range of stimulation wavelengths. A commonly used whitelight source is a halogen bulb with a reflector. The typical halogen bulb produces light in a cone angle that ranges from 5° to 5°. The angle is controlled in part by the shape of the reflector. An example of this type of bulb is the EXN 50 MR16/40 bulb from General Electric. This bulb has a multi-faceted elliptical reflector that removes very high spatial frequencies of light (i.e., bright spots) and re-directs the dominant beam. The far-field projected light pattern resulting from a multifaceted reflector has fewer bright spots (or "hot spots") than the far-field projected light pattern resulting from a smooth-surface elliptical reflector of the same major diameter and focal points. There is a fundamental trade-off between product size, detection efficiency filter performance and illumination cone angle.

Figure 1:
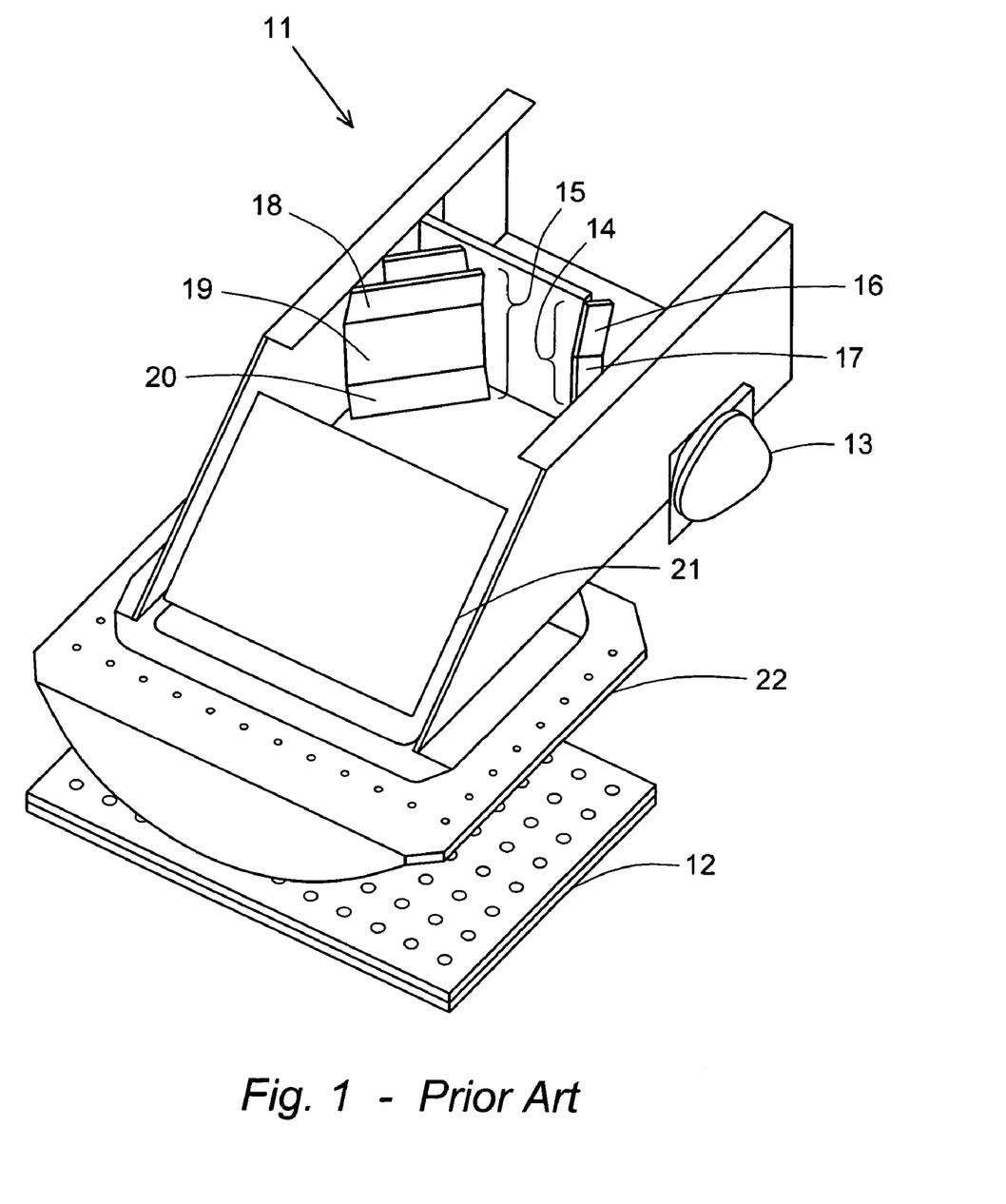
FIG. 1 is a perspective view of a prior art optical illumination system.

Despite the inclusion of facets in the bulb reflector, the light from the bulb must be redirected to a certain degree in order to uniformly illuminate a two-dimensional planar array of wells. Redirection is achieved by a series of mirror surfaces positioned in the path between the bulb and the well plate. An example of an illumination system 11 of the prior art that includes redirecting mirrors is shown in FIG. 1. In this system, the well plate 12 is shown at the bottom and the whitelight source bulb 13 is positioned above and to one side of the well plate 12. Between the bulb 13 and the well plate 12 are two sets of mirrors 14, 15, the first mirror 14 having two segments 16, 17 in a wide V-shaped profile, and the second mirror 15 having three segments 18, 19, 20, the outer segments 18, 20 of which are angled slightly inward toward the inner segment 19. In both mirror sets 14, 15, the angles between the planes of adjacent segments are very small, typically less than 10°. Light reflected from both mirror sets is received by a third mirror 21 (of which only the rear surface is visible) which is a planar mirror directing the light downward toward the well plate 12. Since the light rays from the bulb 13 and hence those reflected by the mirrors are generally divergent, the light reflected by the third mirror 21 is passed through a lens 22 to render the rays parallel, or at least approximately so, before they strike the well plate. The mirror 14 with the two segments in the V-shaped profile directs reflected light to one side of the well array, specifically the side on the right in the view shown in FIG. 1, with the two segments directing the light to the upper and lower halves, respectively, of the right side of the array. The three-segment mirror 15 directs reflected light to the other side of the well array, i.e., the side on the left in the view shown in FIG. 1, with the three segments directing light to the center region of that side. Collectively, the five mirror segments are intended to distribute the light uniformly, or approximately so, across the entire rectangular well array.

Although uniform light distribution across the well array is the goal, this goal is not fully achieved because the line at the angle between adjacent segments on each mirror produces a bright line in the reflected light, i.e., a line that is brighter than regions above and below it. Accordingly, isolated rows in the well plate are illuminated and hence stimulated at a greater intensity than adjacent rows. In the prior art, this undesired difference in brightness is eliminated by masking the line, for example by applying black ink, such as from a felt-tip pen, along the line. This wastes light energy by reducing the amount of stimulation light that reaches the well plate, and is a crude method of correcting nonuniformities.

Figure 2:
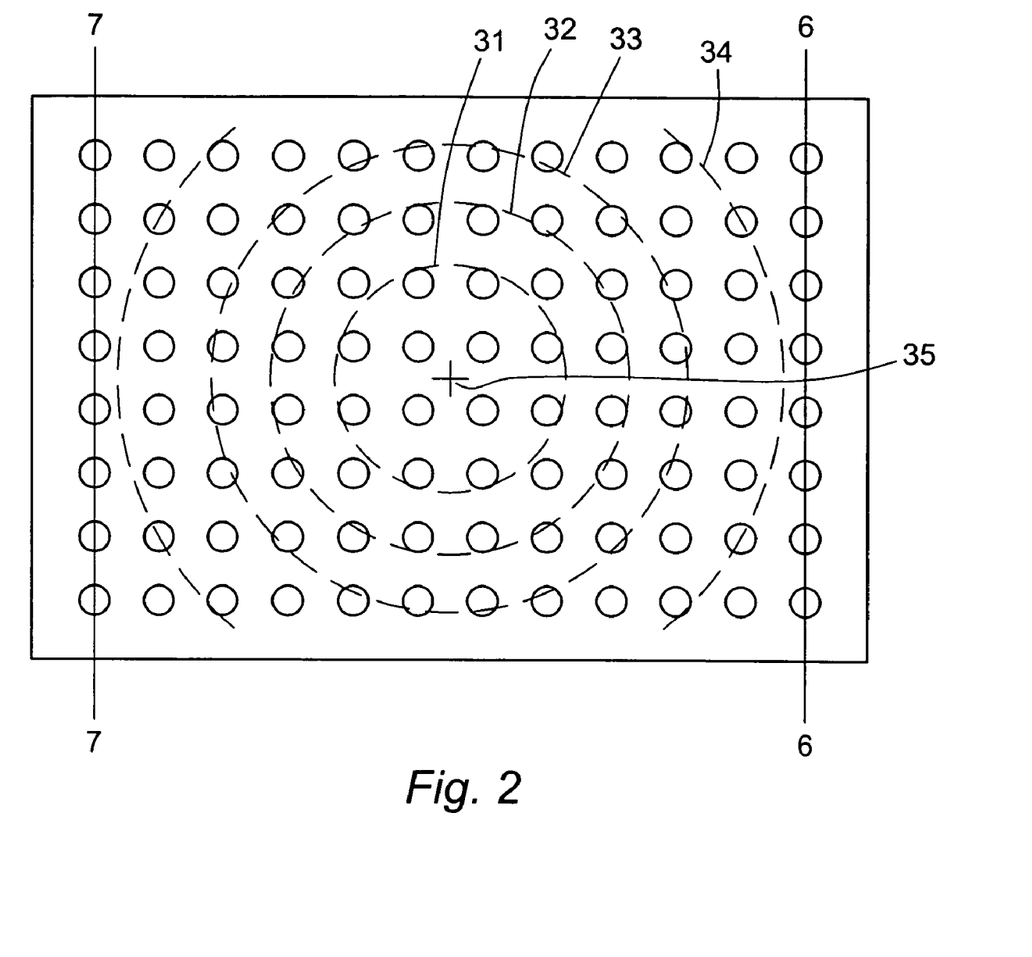
FIG. 2 is a plan view of an area image obtained from the optical illumination system of FIG. 1.

As for the detection components, various methodologies can be used, but a detection component that is typically used is a charge-coupled device (CCD) in conjunction with an appropriate lens or lens system. A series of filters is included to control both the stimulation light and the emission light to narrow bands of frequencies. One artifact of the detection system is an intensity roll-off with the angle from the center line of the optical path, i.e., a gradient along the radial direction in the detected intensities of the emissions. As a result, emissions from wells located successively further from the center are read at successively lower intensities, even if the emissions themselves are uniform across the array. This gradient is demonstrated in FIG. 2, which is a representation of an image from a 12×8 well array. The concentric circles 31, 32, 33, 34 whose centers are coincident with the center 35 of the well array represent lines of constant emission detection intensity, each circle having a detection intensity that is less than the intensity of the adjacent circle of smaller radius. The intensity thus decreases gradually as the circle radius increases.

SUMMARY OF THE INVENTION

The present invention addresses both sources of nonuniformity, i.e., the bright lines in the illumination light reaching the well plate and the radial gradient in the detection components. The invention addresses these nonuniformities by utilizing the light that would otherwise have caused excess stimulation in isolated rows of the well plate and redirecting that light to place excess stimulation in the corners of the well plate. In general, therefore, the light reflected from the mirrors illuminates a target that is rectangular in shape, whether the target is a well plate with a rectangular array of wells or any other planar rectangular area of which an area image is sought. The object and effect of the invention are therefore to process an expanding cone of light from a light source to increase the amount of light directed to the corners of the rectangle. This may result in a uniform distribution of stimulating light over the entire surface of the rectangle, but preferably it produces a higher intensity of stimulating light at the corners of the rectangle than in the center, to compensate for the lower detection efficiency of emissions generated in the regions of the corners and hence the decreasing gradient in intensity recorded by the detector. The result in these embodiments of the invention is thus a non-uniform stimulation to compensate for the non-uniform detection. The present invention resides in modifications to one or both of the two segmented mirrors shown in FIG. 1, and in the improved optical system that results from these modifications to the mirrors. The present invention and the design angles disclosed herein are well suited for bulbs with a variety of cone angles, preferably those with cone angles of from about 30° to about 50°, most preferably about 40°. The invention is particularly useful with an EXN design bulb with a 40 degree cone angle, as well as other bulbs of similar cone angles.

DETAILED DESCRIPTION OF THE INVENTION AND PREFERRED EMBODIMENTS

Figure 4:
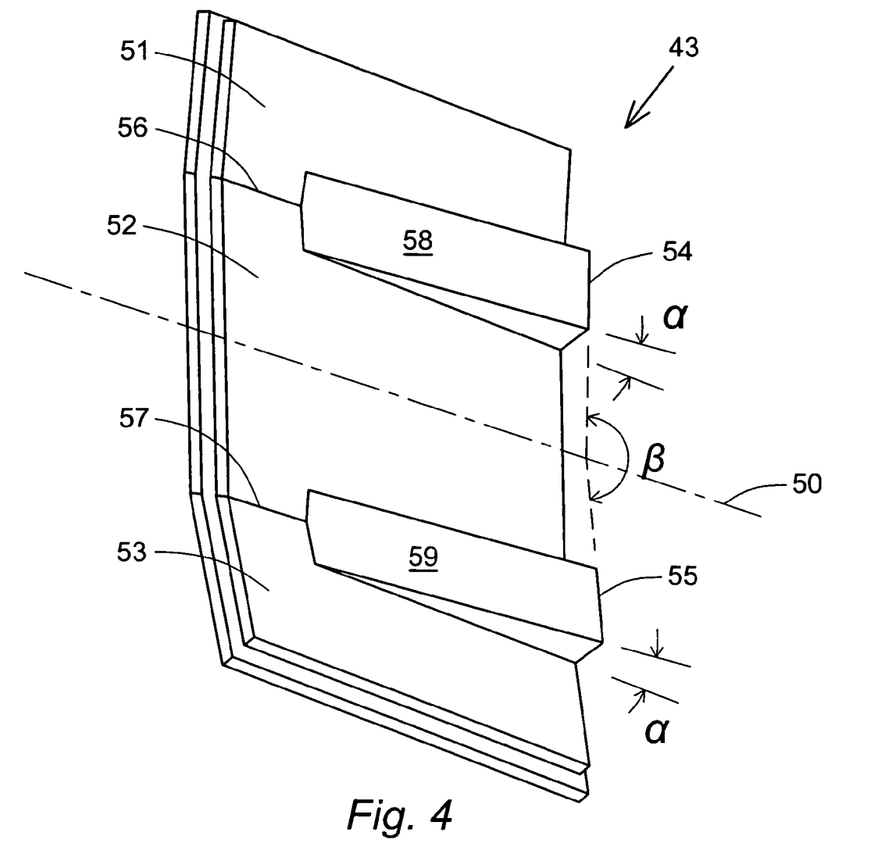
FIG. 4 is a perspective view of one of the two segmented mirrors of the optical illumination system of FIG. 3.
Figure 5:
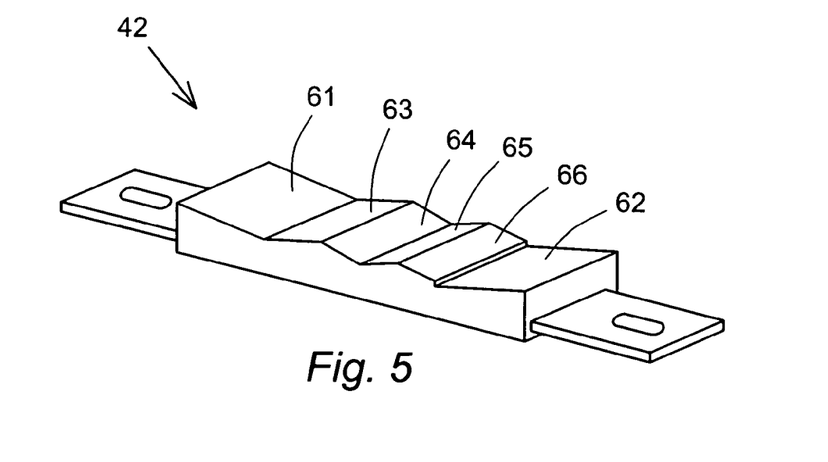
FIG. 5 is a perspective view of the other of the two segmented mirrors of the optical illumination system of FIG. 3.

While the invention is susceptible to certain variations and a range of embodiments, the defining features of the invention are best understood by a detailed study of a single embodiment. One such embodiment is shown in FIGS. 3, 4, and 5 and described below.

The various mirrors that are the subject of this invention are segmented mirrors, and each segment is itself a planar mirror as distinguished from mirrors with curved surfaces. The various segments are oriented at angles relative to each other and adjacent segments share a common boundary or seam line, in the manner of facets in a faceted mirror. The term "linearly joined" is used herein to denote mirror segments that are joined sequentially side-to-side to form a chain. The term "segment" when used to describe a portion of a mirror refers to a single planar facet or section.

The terms "comprise," "comprises," and "comprising," unless otherwise indicated, are used herein to denote the inclusion of the element, component, or step, or group of elements, components, or steps, that follow the term, without excluding any other element, component or step not expressly stated. Likewise, the terms "a" and "an" denote "one or more."

Figure 3:
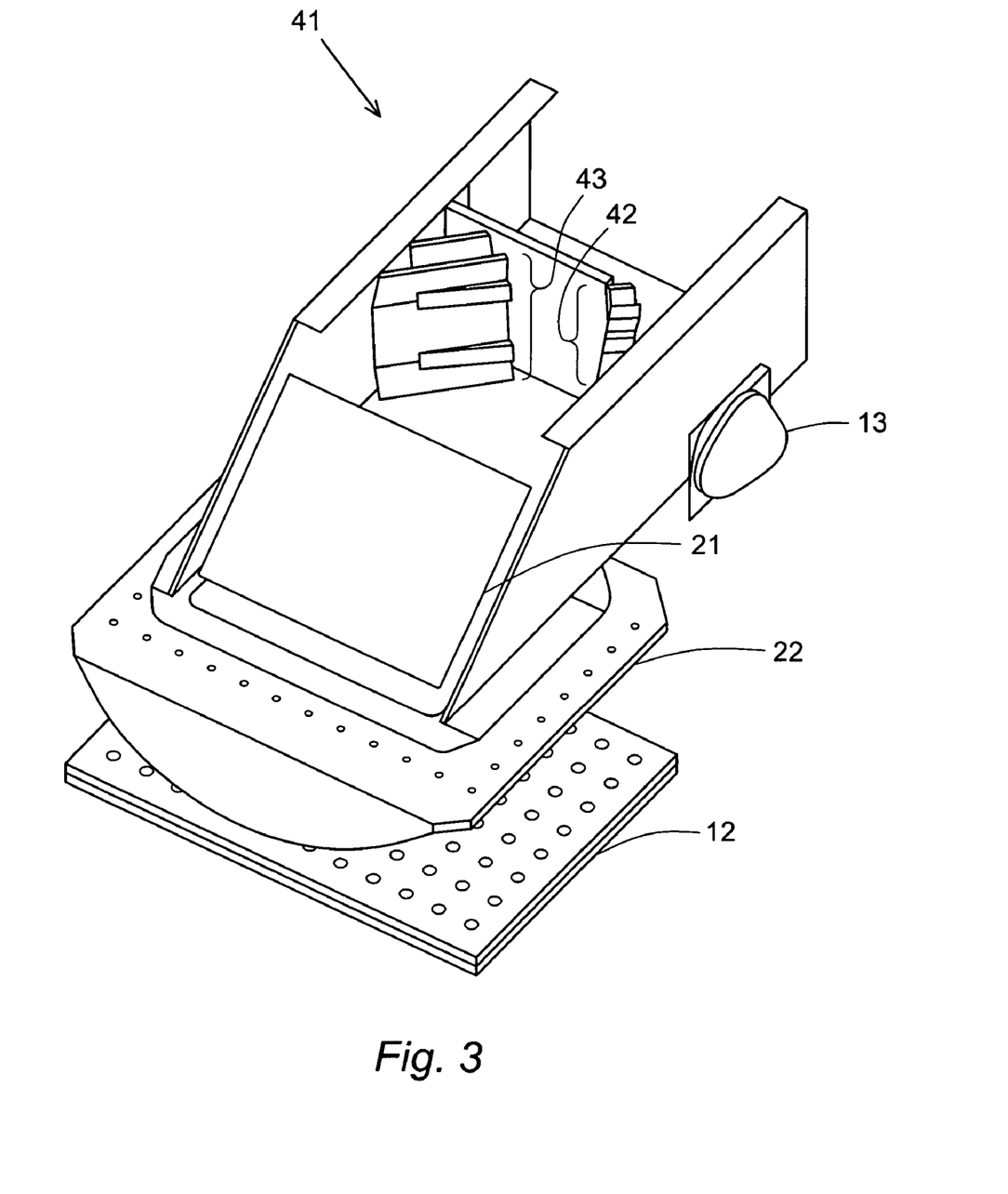
FIG. 3 is a perspective view of a optical illumination system incorporating features of the present invention.

The illumination system 41 of FIG. 3 incorporates the features of the present invention. In this system, the smaller, V-profile mirror 14 of FIG. 1 is replaced by a multi-segmented mirror 42 in which the vertex line of the V-profile is replaced with at least one, preferably at least two, and most preferably four, additional segments. The embodiment in FIG. 3 contains four additional segments for a total of six segments. Likewise, the larger, three-segmented mirror 15 of FIG. 1 is replaced with a multi-segmented mirror 43 in which two wedged segments are added, one at the location of each of the two seam lines joining the original three segments. The segmented mirrors of FIG. 3 are shown in more detail in the succeeding Figures and explained below.

An enlarged view of the larger segmented mirror 43 is shown in FIG. 4, while an enlarged view of the smaller segmented mirror 42 is shown in FIG. 5. In the larger mirror 43 shown in FIG. 4, the three primary segments 51, 52, 53 are linearly joined and correspond to the three segments 18, 19, 20, respectively, of the prior art mirror 15 (FIG. 1). The three primary segments 51, 52, 53 are parallel to a common axis 50 which is represented in this Figure by the centerline of the middle segment 52. The angles between these primary segments are 10° or less, and preferably 5° to 10°. The added wedge segments 54, 55, which are also referred to herein as raised intermediate segments, are positioned along the seam lines 56, 57 joining the three primary segments 51, 52, 53. The upper wedge segment 54 directs light to the rear left corner of the well plate 12 of FIG. 3, according to the view of the well plate as shown in FIG. 3 (where the rear left corner of the plate is not visible). The lower wedge segment 55 directs light to the front left corner of the well plate, again according to the view shown in FIG. 3. Neither wedge segment is parallel to the axis 50. Each wedge segment forms an angle α with the axis 50 and hence with the plane of the center primary segment 52, the angle α being within the range of 5° to 10°, and preferably approximately 7°. The broad surfaces 58, 59 of the two wedge segments, i.e., the reflecting surfaces of the wedge segments, are at an angle β with each other to cause the reflected light from the two wedge segments to strike the two corners on one side of the well plate. The angle β is less than 5°, and preferably from 1° to 5°. Another feature of this embodiment is that the three primary segments 51, 52, 53 are all of equal width (as measured parallel to the axis 50) while both wedge segments 54, 55 are of lesser width (measured in the same approximate direction) than the primary segments, leaving a portion of each seam line 56, 57 exposed.

In the smaller segmented mirror 42 shown in FIG. 5, the two end segments 61, 62 are at the same angle relative to each other as the corresponding two segments 16, 17 of the prior art mirror 14 of FIG. 1. In between these two end segments 61, 62 are a series of at least two, and preferably at least four, intermediate segments forming a zig-zag configuration with the end segments 61, 62. By "zig-zag configuration" is meant that the end segments and intermediate segments are linearly joined with obtuse angles at their seams, alternating between convex and concave. In the embodiment shown in FIG. 5, four intermediate segments 63, 64, 65, 66 are included. The first 63 and third 65 of these together direct light to the rear right corner of the well plate, while the second and fourth 64, 66 together direct light to the front right corner of the well plate, both according to the view shown in FIG. 3. The angles of each of these segments relative to its adjacent segment is in the range of 2° to 9°, i.e., the angles formed by the V's (concave) or inverted V's (convex) of adjacent segments are in the range of 171° to 178°, or more generally, greater than 170°.

Figure 6:
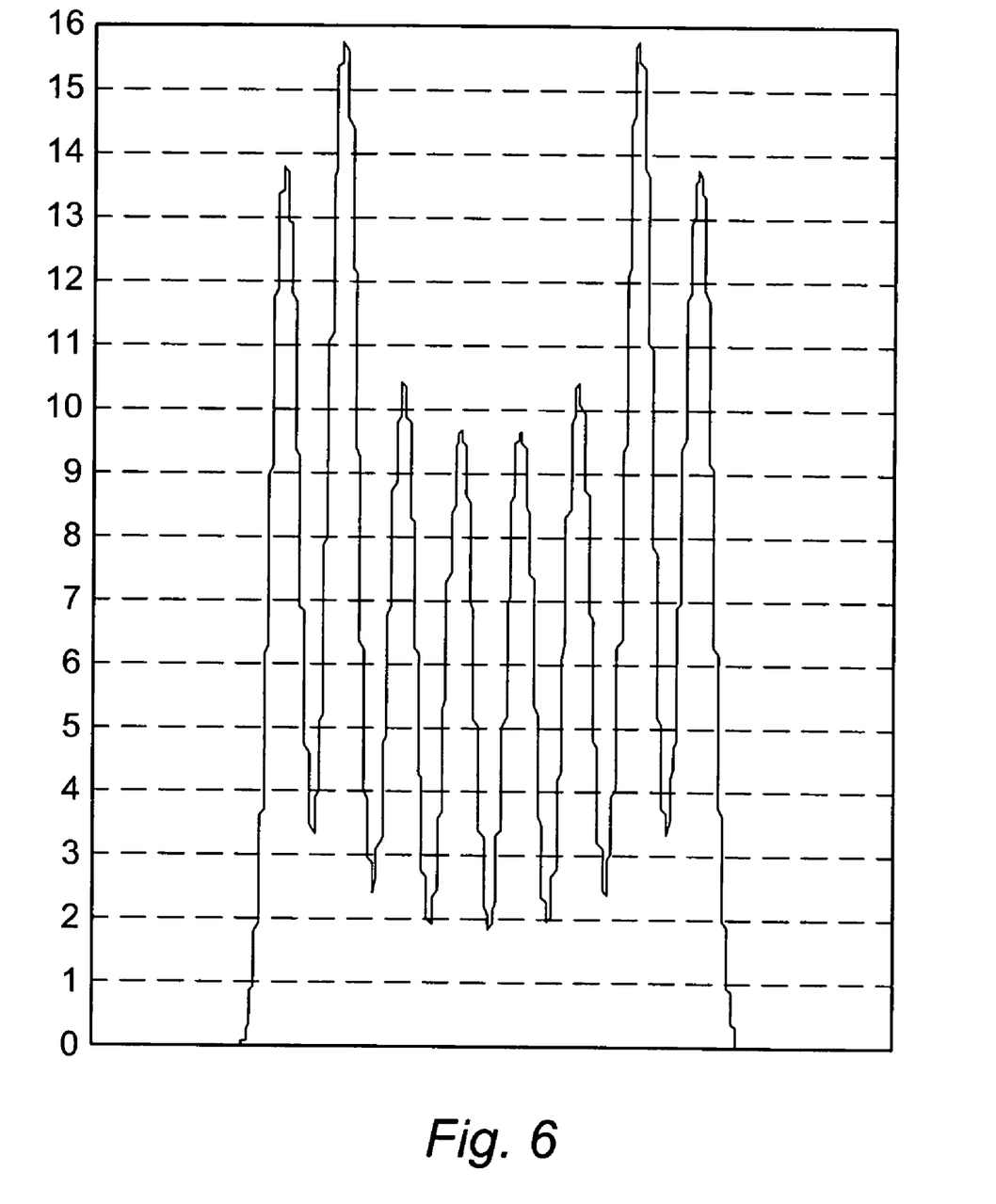
FIG. 6 is a graphical representation of predicted detected irradiance from the region indicated by the line 6-6 of FIG. 2.
Figure 7:
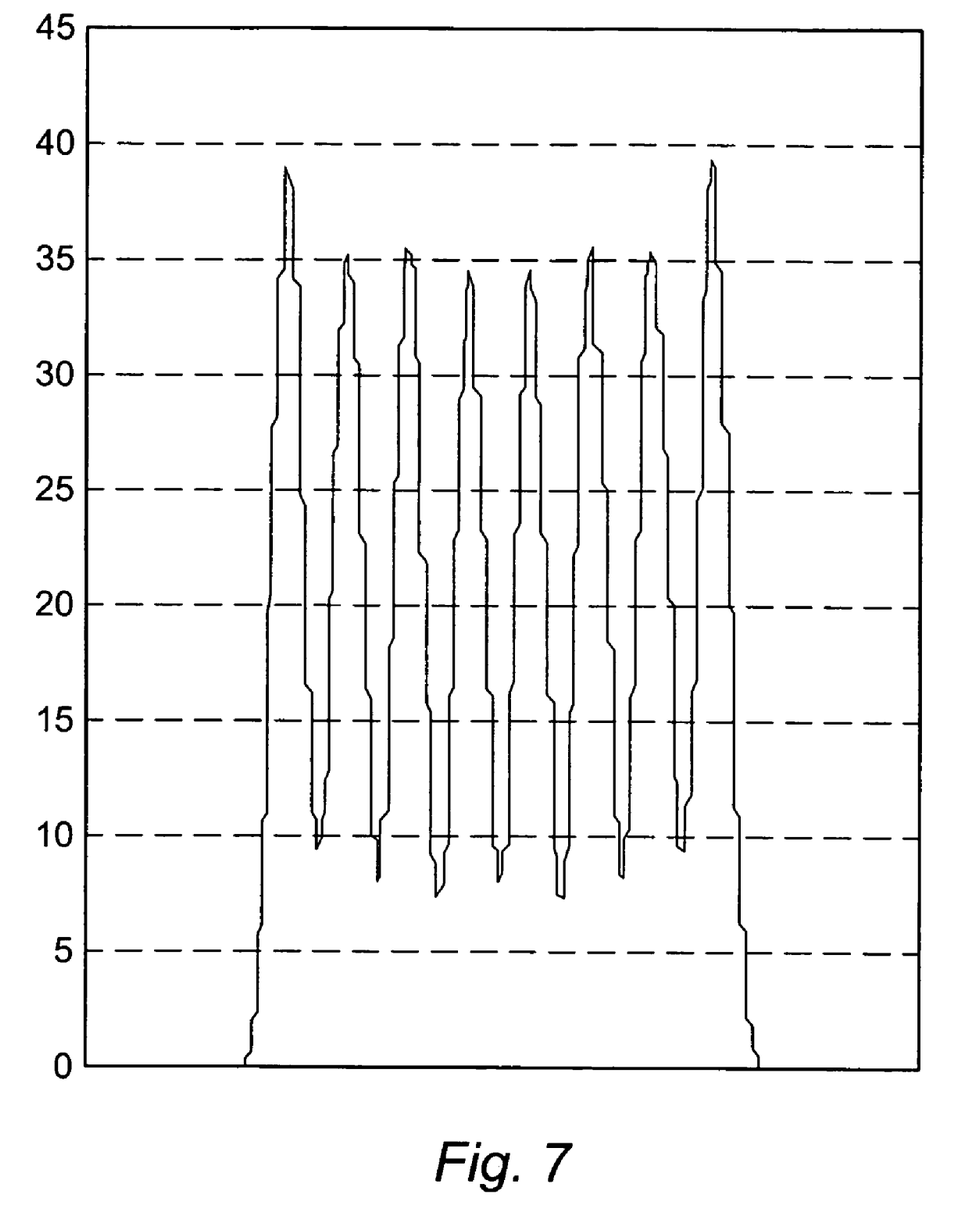
FIG. 7 is a graphical representation of predicted detected irradiance from the region indicated by the line 7-7 of FIG. 2.

To illustrate the effect of these added mirror segments, irradiance predictions were made by a numerical simulation based on non-sequential ray tracing using goniometric measurements of the source bulb. A suitable program is TracePro® (Lambda Research Corporation, Littleton, Mass., USA) and goniometric measurements of the light source are available from Radiant Imaging, Inc. (Duvall, Wash., USA). The TracePro predicted measurements were taken along the two end columns of wells of a well plate containing 12 columns of 8 wells each, i.e., the rightmost column and the leftmost column in the views shown in FIGS. 2 and 3. The rightmost column is indicated by the line 6-6 in FIG. 2, while the leftmost column is indicated by the line 7-7 in FIG. 2. Predictions were developed for the rightmost column with only the smaller segmented mirror 42 in use, and for the leftmost column with only the larger segmented mirror 43 in use. The predictions quantify the light power striking each well. The results are shown in FIG. 6 for the rightmost column and in FIG. 7 for the leftmost column. In each case, the results show that illumination intensity is higher in wells located close to the extremities, i.e., the top and bottom, of the column and hence the corners of the rectangular array. As noted above, this compensates for the drop in detection intensity as the corners are approached.

The angles of each of the two multi-segmented mirrors relative to the light beam from the bulb are readily set and adjusted by flexure mounts. The multi-segmented mirrors themselves can be fabricated by injection molding followed by metallization, or by stamping a thin reflector material such as highly reflective sheet aluminum.

The foregoing is offered primarily for purposes of illustration. Variations in the shapes and arrangements of the various components that still incorporate the basic elements of this invention, as expressed in the following claims, will be readily apparent to those skilled in the art of laboratory equipment and its design, construction, and use.

What is claimed is:

1. A segmented mirror for the redistribution of light from a light source, said segmented mirror comprising three linearly joined, primary mirror segments angled toward each other at angles of about 10° or less, each of said three primary mirror segments parallel to a common axis, and two raised intermediate mirror segments, one such intermediate mirror segment at a junction line between each pair of adjacent primary mirror segments, said intermediate mirror segments not parallel to said axis but instead angled relative to said axis at an angle of 5° to 10°.

2. The segmented mirror of claim 1 wherein said light source has an elliptical reflector with a cone angle of from about 30° to about 50°.

3. The segmented mirror of claim 1 wherein said light source has an elliptical reflector with a cone angle of about 40°.

4. The segmented mirror of claim 1 wherein said primary mirror segments are collectively oriented to reflect incident light to a target that is rectangular in shape and said intermediate mirror segments are oriented to reflect incident light to two adjacent corners on one side of said target.

5. The segmented mirror of claim 1 wherein said primary mirror segments are of equal width along said common axis and said intermediate mirror segments are each of lesser width than said primary mirror segments.

6. The segmented mirror of claim 1 wherein primary mirror segments are angled toward each other at angles of from 5° to 10°.

7. The segmented mirror of claim 1 wherein said intermediate mirror segments are angled relative to each other at an angle of from 1° to 5°.

8. In an optical system for illuminating a rectangular array of samples with excitation light, said optical system comprising a light source, a set of segmented mirrors and a planar mirror, said segmented mirrors positioned to reflect light from said light source to said planar mirror and said planar mirror positioned to reflect excitation light received from said segmented mirrors and to reflect said excitation light toward said rectangular array of samples, the improvement comprising using as one of said segmented mirrors three linearly joined, primary mirror segments angled toward each other at angles less than about 10°, each of said three primary mirror segments parallel to a common axis, and two raised intermediate mirror segments, one such intermediate mirror segment at a junction line between each pair of adjacent primary mirror segments, said intermediate mirror segments not parallel to said axis but instead angled relative to said axis of 5° to 10°.

9. The optical system of claim 8 wherein said primary and intermediate mirror segments are defined as a first segmented mirror, and wherein said improvement further comprises using as another of said segmented mirrors a second segmented mirror comprising four mirror segments linearly joined at junctures forming obtuse angles alternating between concave and convex, and wherein said intermediate mirror segments of said first segmented mirror are positioned to direct light reflected therefrom to said planar mirror such that said planar mirror reflects said light toward both corners on a first side of said rectangular array, and said mirror segments of said second segmented mirror are positioned to direct light reflected therefrom to said planar mirror such that said planar mirror reflects said light toward both corners on a second side of said rectangular array.

10. The optical system of claim 9 wherein said primary mirror segments are angled toward each other at angles of from 5° to 10°.

11. A method for illuminating a rectangular array of reaction wells with excitation light to produce greater illumination in corners of said array than in the center of said array, said method comprising illuminating said array with reflected excitation light from a single bulb, which light is reflected off of a segmented mirror comprising three linearly joined, primary mirror segments angled toward each other at angles of about 10° or less, each of said three primary mirror segments parallel to a common axis, and two raised intermediate mirror segments, one such intermediate mirror segment at a junction line between each pair of adjacent primary mirror segments, said intermediate mirror segments not parallel to said axis but instead angled relative to said axis at an angle of 5° to 10°.

12. The method of claim 11 wherein said primary mirror segments are of equal width along said common axis and said intermediate mirror segments are each of lesser width than said primary mirror segments.

13. The method of claim 11 wherein said segmented mirror is defined as a first segmented mirror and said reflected excitation light is further reflected off of a second segmented mirror comprising four mirror segments linearly joined at junctures forming obtuse angles alternating between concave and convex.

14. A method for detecting the presence of fluorescently labeled analytes in a rectangular array of reaction wells illuminated by a single bulb, said method comprising illuminating said array with reflected excitation light from a single bulb, which light is reflected off of a segmented mirror comprising three linearly joined, primary mirror segments angled toward each other at angles of about 10° or less, each of said three primary mirror segments parallel to a common axis, and two raised intermediate mirror segments, one such intermediate mirror segment at a junction line between each pair of adjacent primary mirror segments, said intermediate mirror segments not parallel to said axis but instead angled relative to said axis at an angle of 5° to 10°, and forming an image of emitted light generated by said array.

15. The method of claim 14 wherein said primary mirror segments are of equal width along said common axis and said intermediate mirror segments are each of lesser width than said primary mirror segments.

16. The method of claim 14 wherein said segmented mirror is defined as a first segmented mirror and said reflected excitation light is further reflected off of a second segmented mirror comprising four mirror segments linearly joined at junctures forming obtuse angles alternating between concave and convex.

* * * * *